(12) United States Patent
Martín García et al.

(10) Patent No.: US 11,224,868 B2
(45) Date of Patent: *Jan. 18, 2022

(54) METHOD FOR THE REMOVAL OF NITROUS OXIDE FROM OFF GAS IN PRESENCE OF CATALYST COMPRISING AN FE-AEI ZEOLITE MATERIAL ESSENTIALLY FREE OF ALKALI METAL

(71) Applicant: Umicore AG & Co. KG, Hanau-Wolfgang (DE)

(72) Inventors: Nuria Martín García, Valencia (ES); Manuel Moliner Marín, Valencia (ES); Avelino Corma Canós, Valencia (ES); Joakim Reimer Thøgersen, Virum (DK); Peter Nicolai Ravnborg Vennestrøm, Virum (DK)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/779,551

(22) PCT Filed: Jan. 30, 2017

(86) PCT No.: PCT/EP2017/051913
§ 371 (c)(1),
(2) Date: May 29, 2018

(87) PCT Pub. No.: WO2017/134007
PCT Pub. Date: Aug. 10, 2017

(65) Prior Publication Data
US 2019/0275504 A1 Sep. 12, 2019

(30) Foreign Application Priority Data
Feb. 1, 2016 (DK) .......................... PA 2016 70054

(51) Int. Cl.
| | | |
|---|---|---|
| *B01D 53/94* | (2006.01) | |
| *B01J 29/76* | (2006.01) | |
| *B01D 53/86* | (2006.01) | |
| *B01J 35/00* | (2006.01) | |
| *B01J 35/04* | (2006.01) | |
| *B01J 37/00* | (2006.01) | |
| *B01J 37/02* | (2006.01) | |
| *B01J 37/04* | (2006.01) | |
| *B01J 37/06* | (2006.01) | |
| *B01J 37/10* | (2006.01) | |
| *B01J 37/30* | (2006.01) | |
| *B01J 29/84* | (2006.01) | |
| *B01J 29/83* | (2006.01) | |
| *B01J 29/85* | (2006.01) | |

(52) U.S. Cl.
CPC ........ *B01J 29/763* (2013.01); *B01D 53/8628* (2013.01); *B01D 53/9418* (2013.01); *B01D 53/9427* (2013.01); *B01J 29/76* (2013.01); *B01J 29/83* (2013.01); *B01J 29/84* (2013.01); *B01J 29/85* (2013.01); *B01J 35/0006* (2013.01); *B01J 35/04* (2013.01); *B01J 37/009* (2013.01); *B01J 37/0244* (2013.01); *B01J 37/0246* (2013.01); *B01J 37/04* (2013.01); *B01J 37/06* (2013.01); *B01J 37/10* (2013.01); *B01J 37/30* (2013.01); *B01D 2251/2062* (2013.01); *B01D 2255/20738* (2013.01); *B01D 2255/50* (2013.01); *B01D 2255/9155* (2013.01); *B01D 2257/402* (2013.01); *B01D 2257/404* (2013.01); *B01D 2258/02* (2013.01); *B01J 2229/186* (2013.01); *Y02C 20/10* (2013.01)

(58) Field of Classification Search
None
See application file for complete search history.

(56) References Cited

U.S. PATENT DOCUMENTS

| | | | | |
|---|---|---|---|---|
| 6,087,295 A | * | 7/2000 | Kharas | ............... B01D 53/9418 423/213.5 |
| 2005/0031514 A1 | * | 2/2005 | Patchett | ............... B01D 5/0054 423/239.2 |

(Continued)

FOREIGN PATENT DOCUMENTS

| | | |
|---|---|---|
| CN | 103118764 A | 5/2013 |
| CN | 103771440 A | 5/2014 |

(Continued)

OTHER PUBLICATIONS

International Searchi Report received in PCT/EP2017/051913 dated Apr. 10, 2017.
Written Opinion received in PCT/EP2017/051913 dated Apr. 10, 2017.
Examination Report received in EP17702841 dated Jul. 30, 2019.
Office Action received in CN201780005654 dated Sep. 24, 2020.
Office Action received in JP2018535365, dated Aug. 16, 2021.

*Primary Examiner* — Sheng H Davis
(74) *Attorney, Agent, or Firm* — Suzannah K. Sundby, Esq.; Canady + Lortz LLP

(57) ABSTRACT

A method for the removal of nitrous oxide from off gas by direct decomposition or by selective catalytic reduction in presence of a reducing agent, comprising the steps of contacting the gas directly or together with the reducing agent or a precursor thereof with a catalyst comprising an Fe-AEI zeolite material essentially free of alkali metal ions (Alk) and having the following molar compositions:

$$SiO_2: oAl_2O_3: pFe: qAlk$$

wherein o is in the range from 0.001 to 0.2;
wherein p is in the range from 0.001 to 0.2;
wherein Alk is one or more of alkali ions and wherein q is less than 0.02.

22 Claims, 4 Drawing Sheets

(56) References Cited

U.S. PATENT DOCUMENTS

| | | | |
|---|---|---|---|
| 2006/0122053 A1* | 6/2006 | Beeckman | B01J 29/40 502/64 |
| 2006/0204417 A1* | 9/2006 | Rini | B01D 53/8625 423/210 |
| 2010/0166632 A1 | 7/2010 | Pieterse et al. | |
| 2011/0061371 A1* | 3/2011 | Cavataio | F01N 3/103 60/286 |
| 2011/0076229 A1 | 3/2011 | Trukhan et al. | |
| 2012/0090296 A1* | 4/2012 | Yacoub | F01N 3/208 60/274 |
| 2013/0089483 A1* | 4/2013 | Stiebels | B01D 53/565 423/239.2 |
| 2014/0112854 A1 | 4/2014 | Mohanan | |
| 2014/0271426 A1* | 9/2014 | Casci | B01D 53/9418 423/213.2 |
| 2015/0033686 A1* | 2/2015 | Shibata | F01N 3/0222 55/482 |
| 2015/0151285 A1 | 6/2015 | Rivas-Cardona | |
| 2015/0308363 A1* | 10/2015 | Choi | F02D 41/0235 123/703 |
| 2015/0367337 A1 | 12/2015 | Yang | |
| 2016/0045868 A1* | 2/2016 | Sonntag | B01J 21/06 423/213.2 |
| 2016/0177793 A1* | 6/2016 | Keppy | F02D 41/0275 60/274 |
| 2016/0367941 A1* | 12/2016 | Gilbert | B01D 53/9436 |
| 2016/0367973 A1* | 12/2016 | Larsson | B01D 53/9418 |

FOREIGN PATENT DOCUMENTS

| | | |
|---|---|---|
| DE | 102014117671 A1 | 6/2015 |
| EP | 3222583 * | 11/2015 |
| JP | 2015533342 A | 11/2015 |
| WO | 2012007914 A2 | 1/2012 |
| WO | 2014062949 A1 | 4/2014 |
| WO | 2014141200 A1 | 9/2014 |
| WO | 2015084834 A1 | 6/2015 |
| WO | 2015145113 A1 | 10/2015 |

* cited by examiner

METHOD FOR THE REMOVAL OF NITROUS OXIDE FROM OFF GAS IN PRESENCE OF CATALYST COMPRISING AN FE-AEI ZEOLITE MATERIAL ESSENTIALLY FREE OF ALKALI METAL

FIELD OF THE INVENTION

The present invention relates in general to the removal of harmful nitrous oxide ($N_2O$) and optionally nitrogen oxides ($NO_x$=NO and $NO_2$) from exhaust, flue and off gasses. In particular, the invention relates to the removal of nitrous oxide ($N_2O$) by direct decomposition or by selective catalytic reduction (SCR) using ammonia, or assisted by hydrocarbons or by the presence of nitrogen oxides in presence of a hydrothermally stable iron-containing AEI zeolite in its silicoaluminate form.

BACKGROUND FOR THE INVENTION

Environmental and health risks request removing harmful nitrous oxide ($N_2O$) and nitrogen oxides (NO and $NO_2$) from flue and off gasses to avoid them being released into the environment. $N_2O$ as well as NO and $NO_2$ are typical by-products from various industrial processes, e.g. during production of nitric and adipic acid.

A common process to prepare nitric acid is the Ostwald process. In this process ammonia is converted to nitric acid in two stages. In the first stage, ammonia is oxidized in the presence of a catalyst such as platinum typically with some amount of rhodium, to form nitric oxide and water.

In the second stage, nitric oxide is oxidized to nitrogen dioxide, which is then absorbed in water, yielding the desired nitric acid product. However, $N_2O$ is also formed in the process and needs to be removed.

Release of $N_2O$ is typically regulated by legislation that is becoming increasingly more stringent in most areas around the world. Selective catalytic reduction (SCR) of $N_2O$ by a reducing agent is an efficient way of reducing the amount of $N_2O$ in an exhaust, gas stream or flue gas. Typically, the reducing agent is a nitrogenous compound, such as ammonia or urea.

Besides nitrogenous containing compounds other compounds can also be used as reducing agents in the SCR reaction of $NO_x$. Especially hydrocarbons (HC) can also be used to selectively reduce nitrogen oxides (HC-SCR).

$N_2O$ can also be removed catalytically by direct decomposition or it can be assisted by the presence of NO as reducing agent.

A general issue in the abatement of $N_2O$ or $NO_x$ from exhaust, off or flue gas systems from industrial processes, internal combustion engines, power plants, gas turbines, gas engines and the like is the penalty in pressure drop when a catalytic converter, such as a monolithic structure, or any other article is introduced into the exhaust or flue gas system. The penalty arises because of the additional pressure required to push the exhaust or flue gas through the catalytic converter. Any decrease in the pressure drop over the catalytic converter will have a positive influence on efficiency and economy of the process. One method to decrease the pressure drop is decreasing the size of the catalytic converter without compromising the reduction efficiency, which requires use of a more active catalyst composition. Therefore, any increase in catalyst activity is desirable.

Aluminosilicate zeolites and silicoaluminophosphate zeotypes can be used as catalysts in the removal of nitrous oxide and nitrogen oxides. In most cases the zeolite is typically promoted with transition metals. The most common used transition metals are iron and copper and the most commonly tested zeolite frameworks are *BEA, MFI and CHA (all given by the three-letter code devised by the International Zeolite Association).

Since most exhaust, flue and off gasses contain some amount of water, there is a requirement for a high hydrothermal stability of the catalyst situated in a system wherefrom nitrous oxide or nitrogen oxides should be removed. Especially the presence of water in the exhaust or flue gas is detrimental for zeolite-based catalysts since they are known to deactivate due to hydrolysis or degradation of the framework in presence of steam. Without being bound by any theory we believe this is related to dealumination of the aluminosilicate zeolite and thus will depend on the specific zeolite framework topology as well as the presence and identity of any extra-framework species hosted inside and onto the zeolite.

In general, there are several issues related to the use of metal promoted zeolites. First of all, the hydrothermal stability of the zeolite is not always sufficient. Since there will typically be some amount of water present in the application wherein the zeolite catalytic article is to be used, this, will in combination with high-temperature excursions, lead to dealumination and collapse of the crystalline microporous structure of the zeolite, that will ultimately lead to deactivation of the catalytically active material. Secondly, any hydrocarbons present will adsorb and potentially deactivate the zeolite catalyst. Additionally, the presence of sulfur containing species (e.g. $SO_2$ and $SO_3$ etc.) in the system will lead to deactivation of the zeolite catalyst. In addition, the zeolite itself may also produce unwanted $N_2O$ under a certain set of conditions. Furthermore, unwanted oxidation of ammonia, when present, at higher temperatures also occurs.

In terms of the transition metal introduced into the zeolite it is generally accepted that concerning $NO_x$ removal, Cu-promotion leads to a higher $NH_3$—SCR activity at low temperatures (<300° C.) compared to Fe. However, Cu-promoted materials also produce more $N_2O$ and are less selective for the $NH_3$—SCR reaction at higher temperatures (>300° C.) due to unselective ammonia oxidation. When it comes to the influence of the transition metal the hydrothermal stability seems to be more dependent on the specific type of zeolite and zeotype framework. For example, Fe-*BEA materials are typically more hydrothermally stable than Cu-*BEA materials, whereas Cu-CHA materials are more hydrothermally stable than Fe-CHA materials [F. Gao, Y. Wang, M. Kollar, N. M. Washton, J. Szanyi, C. H. F. Peden, Catal. Today 2015, 1-12]. Another difference between Fe- and Cu-zeolites is their selectivity towards $N_2O$. It is generally accepted that Fe-promoted materials produce less $N_2O$ than their Cu-based equivalents [S. Brandenberger, O. Kröcher, A. Tissler, R. Althoff, Catal. Rev. 2008, 50, 492-531].

In the last years, it has been described that copper-containing small-pore aluminosilicate and silicoaluminophosphate Cu-CHA materials, Cu-SSZ-13 and Cu-SAPO-34 respectively, show high catalytic activity and hydrothermal stability for use as $NH_3$—SCR catalyst for $NO_x$ removal [U.S. Pat. No. 7,601,662 B2; European Patent 2150328 B1, U.S. Pat. No. 7,883,678 B2].

[F. Gao, Y. Wang, N. M. Washton, M. Kollar, J. Szanyi, C. H. F. Peden, ACS Catal. 2015, DOI 10.1021/acscatal.5b01621] investigate the effect of alkaline and alkaline cocations in Cu-CHA aluminosilicate SSZ-13. They find that certain cocations in combination with the promotor metal-ion can enhance the activity as well as the hydrothermal stability of the Cu-CHA-based material. The study is however, limited to aluminosilicate zeolite SSZ-13 (CHA-zeolite) and any conclusions based on this material cannot be transferred to other aluminosilicate zeolite materials, frameworks or other promotor metal based zeolite systems.

Another zeolite topology related to that of CHA is the AEI topology. This structure also exhibits small pores (defined by eight oxygen atoms in micropore windows of the structure), similar to the CHA structure. Thus, without being bound by any theory, some of the benefits from using a CHA zeolite or zeotypes should also be present in the use of AEI based zeolite and zeotype. A method of synthesis of aluminosilicate AEI zeolite SSZ-39 was first disclosed in U.S. Pat. No. 5,958,370 using a variety of cyclic and polycyclic quaternary ammonium cation templating agents. U.S. Pat. No. 5,958,370 also claims a process for the reduction of oxides of nitrogen contained in a gas stream in the presence of oxygen wherein said zeolite contains metal or metal ions capable of catalyzing the reduction of the oxides of nitrogen.

U.S. Pat. No. 9,044,744 B2 discloses an AEI catalyst promoted with about one to five weight percent of a promoter metal present. U.S. Pat. No. 9,044,744 B2 is ambiguous about the content of alkali and alkaline earth metals in the zeolite. In the description of U.S. Pat. No. 9,044,744 B2 a certain embodiment is mentioned where the catalyst composition comprises at least one promoter metal and at least one alkali or alkaline earth metal. In another embodiment the catalyst is essentially free of any alkali or alkaline earth metals except potassium and or calcium. However, there is no discussion or mention of the benefits of alkali or alkaline earth metals being present in the catalyst. U.S. Patent 20150118134 A1 and [M. Moliner, C. Franch, E. Palomares, M. Grill, A. Corma, Chem. Commun. 2012, 48, 8264-6] teaches us that the AEI zeolite framework promoted with copper ions is a stable zeolite $NH_3$—SCR catalyst system for treating the exhaust gas from an internal combustion engine. The Cu-AEI zeolite and zeotype catalytic system is stable during regeneration of an up-stream particulate filter up to 850° C. and water vapour content up to 100%. However, the effect of alkali is not discussed. Furthermore, the patent applications are solely concerned about the use of copper as a promoter metal ion, and the effect can therefore not be transferred to catalytic systems with other promoter metal ions.

In many applications it is beneficial to have a high catalytic activity for $NO_x$ removal at temperatures >300° C. and at the same time have a high selectivity towards the $NH_3$—SCR reaction without forming nitrous oxide or unselective ammonia oxidation. In such applications iron-promoted zeolites are preferred.

Some zeolite catalysts are reported to be able to decompose nitrous oxide at higher temperatures [Y. Li, J. N. Armor, Appl. Catal. B Environ. 1992, 1, L21-L29]. Fe-*BEA zeolites are in general highly active in this reaction [B. Chen, N. Liu, X. Liu, R. Zhang, Y. Li, Y. Li, X. Sun, Catal. Today 2011, 175, 245-255] and should be considered state-of-the-art as catalysts for $N_2O$ removal.

U.S. Pat. No. 7,462,340 B2 discloses a process using iron laden zeolites for reducing the $N_2O$ content of a gas stream, specifically of the frameworks: MFI, BEA, FER, MOR, FAU and MEL. U.S. Pat. No. 7,744,839 mentions the same frameworks for $N_2O$ reduction. None of these patents, however, mention any use of the AEI framework for $N_2O$ reduction.

Patent application US 2003/0143141 mentions only the use of iron promoted zeolites of type MFI, BEA, FER, MOR and MEL for reducing the $N_2O$ content in a gas.

In applications where the catalyst is exposed to high temperatures it is necessary to maintain the catalytic activity without severe deactivation. Typically, the gas stream wherein the catalyst will be situated contains some amount of water. For this reason, the hydrothermal stability of the catalyst should be high. This is especially detrimental for zeolite-based catalyst as they are known to deactivate due to hydrolysis or degradation of the framework in the presence of steam. Thus any improvements to the hydrothermal stability to zeolite catalysts are highly appreciated.

Some Cu-promoted zeolites exhibit high hydrothermal stability and can typically tolerate temperature excursion up to about 850° C. However, this is not the case for Fe-promoted zeolites and the hydrothermal stability of Fe-promoted zeolites is in general lower than Cu-zeolites. The fact that Fe- and Cu-zeolites deactivate in a different manner is further corroborated in a study by Vennestrom et al. [P. N. R. Vennestrom, T. V. W. Janssens, A. Kustov, M. Grill, A. Puig-Molina, L. F. Lundegaard, R. R. Tiruvalam, P. Concepcion, A. Corma, J. Catal. 2014, 309, 477-490.]

We have found that when decreasing the alkali metal content in iron promoted AEI zeolites, the hydrothermal stability is increased. By decreasing the alkali content, which is naturally present after synthesis of AEI zeolites, the stability of iron-promoted AEI zeolite becomes higher than other zeolite systems with similar iron contents.

We have additionally found that a Fe-AEI zeolite catalyst essentially free of alkali ions is highly active and stable when applied in the reduction of nitrous oxide ($N_2O$) in a flue gas from e.g. the production of nitric or adipic acid. This catalyst can decompose nitrous oxide either by direct decomposition, by decomposition assisted by the presence of nitrogen oxides or using a reducing agent such as ammonia or hydrocarbons in the following reactions:

Direct decomposition: $2N_2O \rightarrow 2N_2 + O_2$ $NH_3$ as reducing agent: $3N_2O + 2NH_3 \rightarrow 4N_2 + 3H_2O$ NO as reducing agent: $N_2O + NO \rightarrow N_2 + NO_2$ HC as reducing agent: $(3n+1)N_2O + C_nH_{2n+2} \rightarrow nCO_2 + (3n+1)N_2 + (n+1)H_2O$ $(2n+1)N_2O + C_nH_{2n+2} \rightarrow nCO + (2n+1)N_2 + (n+1)H_2O$

SUMMARY OF THE INVENTION

Pursuant to the above findings, this invention provides a method for the removal of nitrous oxide from off gas by direct decomposition or by selective catalytic reduction in presence of a reducing agent, comprising the steps of contacting the exhaust, flue or off gas directly or together with the reducing agent or a precursor thereof with a catalyst comprising an Fe-AEI zeolite material essentially free of alkali metal ions (Alk) and having the following molar compositions:

$SiO_2$: $oAl_2O_3$: $p$Fe: $q$Alk wherein o is in the range from 0.001 to 0.2;
wherein p is in the range from 0.001 to 0.2; and
wherein Alk is one or more of alkali ions and wherein q is below 0.02.

Specific features of the invention are alone or in combination thereof that o is in the range from from 0.005 to 0.1, p is in the range from 0.005 to 0.1 and q is below 0.002;

o is in the range from 0.02 and 0.07, p is in the range from 0.01 to 0.07 and q is below 0.001;

Alk is sodium and wherein the sodium is essentially absent in the catalyst;

the exhaust gas contains more than about 0.05% steam;

the exhaust gas is at a temperature of above 200° C.;

the catalyst is coated in or on a substrate;

the substrate is a metallic substrate or an extruded ceramic substrate or a corrugated ceramic substrate;

the substrate is in form of a flow-through monolith, a flow-through honeycomb or a wall-flow filter;

the catalyst is coated in an amount of between 10 and 600 g/L calculated on the weight of catalyst material per volume of the total substrate plus the catalyst material;

the amount of the catalyst coated on the substrate is between 100 and 300 g/L;

the catalyst is coated in or on the porous substrate in form of a wash coat comprising the catalyst and a binder comprising $TiO_2$, $SiO_2$, $Al_2O_3$, $ZrO_2$, $CeO_2$ and combinations thereof;

the catalyst is coated as a layer on the substrate and wherein the substrate comprises one or more other layers comprising a catalyst with a different catalytic activity or on other zeolite catalysts;

the catalyst is zone coated on the substrate;

the reducing agent is selected from the group consisting of ammonia, hydrocarbon, nitrogen monoxide and mixtures thereof;

the exhaust, flue or off gas is tail gas from nitric acid or adipic acid production;

the reducing agent is added in controlled amounts to the exhaust, flue and off gas upstream of the catalyst;

amounts of nitrogen oxides are removed in an additional downstream or upstream catalyst unit;

the catalyst unit comprises the Fe-AEI zeolite material essentially free of alkali metal ions (Alk);

nitrogen oxides are additionally removed together with the nitrous oxide by addition of the reducing agent;

the reducing agent is selected from the group consisting of ammonia and hydrocarbons;

the catalyst in the additional catalyst unit comprises an Fe-AEI zeolite material essentially free of alkali metal ions (Alk) is combined with a second catalyst composition active in the selective reduction of nitrogen oxides.

BRIEF DESCRIPT OF THE DRAWINGS

DETAILED DESCRIPTION OF THE INVENTION

Figure 1:
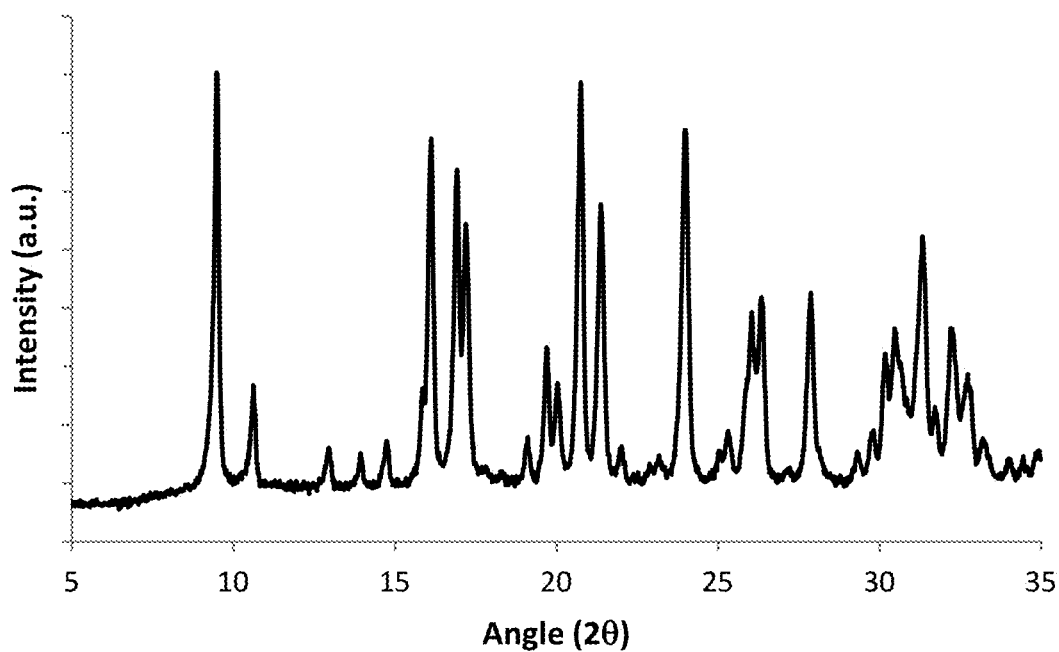
FIG. 1 is a Powder X-ray diffraction pattern of as-prepared silicoaluminate AEI zeolite synthesized according to Example 1.

The catalyst for use in the method according to the invention can be prepared by a method, comprising the following steps:

(i) preparation of a mixture containing water, a high-silica zeolite as main source of silica and alumina, an alkyl-substituted cyclic ammonium cation as organic structure directing agent (OSDA), a source of iron, and a source of an alkali metal cation [Alk], to obtain a final synthesis mixture having the following molar composition:

$SiO_2$: $aAl_2O_3$: $bFe$: $cOSDA$: $dAlk$: $eH_2O$ wherein a is in the range from 0.001 to 0.2; more preferably in the range from 0.005 to 0.1, and more preferably in the range from 0.02 to 0.07.

wherein b is in the range from 0.001 to 0.2; more preferably in the range from 0.005 to 0.1, and more preferably in the range from 0.01 to 0.07.

wherein c is in the range from 0.01 to 2; more preferably in the range from 0.1 to 1, and more preferably in the range from 0.1 to 0.6.

wherein d is in the range from 0.001 to 2; more preferably in the range from 0.05 to 1, and more preferably in the range from 0.1 to 0.8.

wherein e is in the range from 1 to 200; more preferably in the range from 1 to 50, and more preferably in the range from 2 to 20.

(ii) crystallization of the mixture achieved in (i) in a reactor.

(iii) recovery of the crystalline material achieved in (ii);

(iv) removal of the OSDA occluded in the zeolite structure by calcination of the crystalline material from step (iii);

(v) ion exchange of the alkali metal cation present in the crystalline material after step (iv), with ammonium or proton cations to obtain a final crystalline zeolite catalyst material with a low alkali content Preferably, the high-silica zeolite structure used as a main source of silica and alumina has a Si/Al ratio above 5. Even more preferable the high silica zeolite has the FAU structure, e.g. Zeolite-Y.

The iron source can be selected from iron oxides or iron salts, such as chlorides and other halides, acetates, nitrates or sulfates, among others, and combinations of them. The iron source can be introduced directly in the mixture of (i), or previously combined with the crystalline source of Si and Al.

Any alkyl-substituted cyclic ammonium cation can be used as OSDA. Preferred are N,N-dimethyl-3,5-dimethylpiperidinium (DMDMP), N,N-diethyl-2,6-dimethylpiperidinium, N,N-dimethyl-2,6-dimethylpiperidinium, N-ethyl-N-methyl-2,6-dimethylpiperidinium, and combinations of them.

In step (i) any alkali cation can be used, such as sodium, potassium, lithium, and cesium and combinations of them.

In the crystallization step (ii), hydrothermal treatment is performed in an autoclave, under static or dynamic conditions. The preferred temperature is in the range of between 100 and 200° C., more preferably in the range of 130 to 175° C.

The preferred crystallization time is ranged from 6 hours to 50 days, more preferably in the range of 1 to 20 days, and more preferably in the range of 1 to 7 days. It should be taken into consideration that the components of the synthesis mixture may come from different sources, and depending on them, times and crystallization conditions may vary.

In order to facilitate the synthesis, crystals of AEI can be added as seeds, in quantities up to 25% by weight respect to the total of oxides, to the synthesis mixture. These can be added before or during the crystallization process.

After the crystallization stage described in (ii), the resultant solids are separated from the mother liquor. The solids can be washed and separated from the mother liquor in (iii) by decantation, filtration, ultrafiltration, centrifugation, or any other solid-liquid separation technique.

The method comprises a stage of elimination of the organic occluded inside the material, which can be performed by extraction and/or thermal treatment at temperatures over 25° C., preferentially between 400 and 750° C., during a period of time between 2 minutes and 25 hours.

The material essentially free of occluded organic molecules obtained in step (iv) is ion exchanged with ammonium or hydrogen to selectively remove the alkali metal cations by cation exchange procedures. The resulting exchanged AEI material can be calcined with air and/or nitrogen at temperatures between 200 and 700° C.

The catalyst for use in the method according to the invention can also be prepared by first synthesizing an AEI zeolite SSZ-39 according to known methods as described in U.S. Pat. No. 5,958,370. After synthesis the occluded organic material must be removed as described above. Afterwards the material essentially free of occluded organic molecules is ion exchanged with ammonium or hydrogen ions to selectively remove the alkali metal cations by cation exchange procedures. Instead of including iron compounds in the synthesis mixture, iron can be introduced into the cation exchanged material after step (v) by exchange, impregnation or solid-state procedures to yield a zeolite with the AEI framework containing iron species and essentially free of alkali metals.

The Fe-AEI zeolite catalyst for use in the method according to the invention is particular useful in heterogeneous catalytic converter systems, such as when the solid catalyst catalyzes the reaction of molecules in the gas phase. To improve the applicability of the catalyst it can be applied into or onto a substrate that improves contact area, diffusion, fluid and flow characteristics of the gas stream wherein the present invention is applied.

The substrate can be a metal substrate, an extruded substrate or a corrugated substrate made of ceramic paper. The substrate can be designed for the gas as a flow-through design or a wall-flow design. In the latter case the gas should flow through the walls of the substrate and in this way contribute with an additional filtering effect.

In the method according to the invention, the Fe-AEI zeolite catalyst is preferably present on or in the substrate in amounts between 10 and 600 g/L, preferably 100 and 300 g/L, as measured by the weight of the zeolite material per volume of the total catalyst article In the method according to the invention, the Fe-AEI zeolite catalyst can be coated onto the substrate using known wash-coating techniques. In this approach the zeolite powder is suspended in a liquid media together with binder(s) and stabilizer(s) whereafter the washcoat can be applied onto the surfaces and walls of the substrate.

The washcoat containing the Fe-AEI zeolite catalyst contains optionally binders based on $TiO_2$, $SiO_2$, $Al_2O_3$, $ZrO_2$, $CeO_2$ and combinations thereof.

The Fe-AEI zeolite catalyst can also be applied as a single or multiple layers on the substrate in combination with other catalytic functionalities or other zeolite catalysts. One specific combination is a layer with a catalytic oxidation functionality containing for example platinum or palladium or combinations thereof.

The Fe-AEI zeolite catalyst can be additionally applied in limited zones along the gas-flow-direction of the substrate.

In one embodiment of the invention, the catalyst capable of removing nitrous oxide can be located in combination with a nitric acid production loop and to facilitate nitrous oxide removal by functioning in either a secondary or a tertiary abatement setup.

In a certain embodiment of the invention, the catalyst is applied in a secondary nitrous oxide abatement setup, where the catalyst is located inside an ammonia oxidizer or ammonia burner, immediately after the ammonia oxidation catalyst. In such a setup the catalyst is exposed to high temperatures and catalyst performance can therefore only be achieved using a highly stable material as described herein.

In another certain embodiment of the invention, the catalyst is applied in a tertiary nitrous oxide abatement setup. In this case the catalytic article is located downstream from the ammonia oxidizer or ammonia burner after an absorption loop of the nitrogen dioxide to produce the nitric acid. In this embodiment the catalytic article is part of a two-step process and located up-stream from a catalyst for removal of nitrogen oxides. The catalytic article of the present invention will remove the nitrous oxide either by direct decomposition or assisted by nitrogen oxides (NOx) also present in the gas stream or assisted by the presence of hydrocarbons (HC). The highly stable material described herein will result in long lifetime of a catalyst in such an application or enable a higher operating temperature which results in a faster reaction rate and a smaller catalyst volume.

In a certain embodiment of the invention where the catalyst is applied in a tertiary setup, the catalyst for removal of nitrous oxide and the catalyst for removal of nitrogen oxides located downstream are both the Fe-AEI zeolite catalyst essentially free of alkali obtained by one of the realizations described herein. In this case a reducing agent will be added upstream the catalyst for removal of nitrogen oxides. In a particular embodiment, the catalytic step for removal of nitrogen oxides will also remove an amount of nitrous oxide which was not removed in the first catalytic step. This way, the volume of the first catalytic step can be reduced, resulting in lower costs.

In a certain embodiment of the invention where the catalyst is applied in a tertiary setup, the catalyst for removal of nitrous oxide and the catalyst for removal of nitrogen oxides are both the Fe-AEI zeolite catalyst essentially free of alkali obtained by one of the inventive features described herein, where the catalytic step for removal of nitrogen oxides are located upstream the catalytic step of removing nitrous oxide. In this case a reducing agent will be added upstream the catalyst for removal of nitrogen oxides and a reducing agent is added upstream the catalyst for removal of nitrous oxide. In a particular embodiment, the catalytic step for removal of nitrogen oxides will also remove an amount of nitrous oxide.

The two catalytic functions (deN$_2$O and deNO$_x$) may be located in separate reactors or inside the same reactor, where a reducing agent is added before the catalytic step of removing nitrogen oxides.

The two catalytic functions (deN$_2$O and deNO$_x$) may also be combined into a one-step catalytic conversion. In such a converter the Fe-AEI zeolite catalyst essentially free of alkali can be used as the only catalytically active phase or it can be applied in combinations with other nitrous oxide removal catalysts or SCR catalysts.

In another certain embodiment, a hydrocarbon can be used as reducing agent. In one particular embodiment the hydrocarbon is methane.

In another certain embodiment, ammonia is used as reducing agent.

The Fe-AEI catalyst can also be combined in zones or layers with other catalytic materials. For example, the catalyst can be combined with other zeolites or other materials with a different functionality.

In all application of the method according to the invention mentioned and described above, the Fe-AEI zeolite catalyst can be applied in or on a substrate such as a monolithic structure or it can be shaped into pellets depending on the requirements of the application.

EXAMPLES

Example 1

Synthesis of AEI Zeolite (Na-Containing Material)

4.48 g of a 7.4% wt aqueous solution of N,N-dimethyl-3,5-dimethylpiperidinium hydroxide was mixed with 0.34 g of a 20% wt aqueous solution of sodium hydroxide (NaOH granulated, Scharlab). The mixture was maintained under stirring 10 minutes for homogenization. Afterwards, 0.386 g of FAU zeolite (FAU, Zeolyst CBV-720 with SiO$_2$/Al$_2$O$_3$=21) was added in the synthesis mixture, and maintained under stirring the required time to evaporate the excess of water until achieving the desired gel concentration. The final gel composition was SiO$_2$:0.047 Al$_2$O$_3$:0.4 DMDMP:0.2 NaOH:15H$_2$O. The resultant gel was charged into a stainless steel autoclave with a Teflon liner. The crystallization was then conducted at 135° C. for 7 days under static conditions. The solid product was filtered, washed with abundant amounts of water, dried at 100° C. and, finally, calcined in air at 550° C. for 4 h.

The solid was characterized by Powder X-ray Diffraction, obtaining the characteristic peaks of the AEI structure (see FIG. 1). The chemical analysis of the sample indicates a Si/Al ratio of 9.0.

Example 2

Direct Synthesis of the Fe-Containing AEI Structure (Na-Containing Material)

Figure 2:
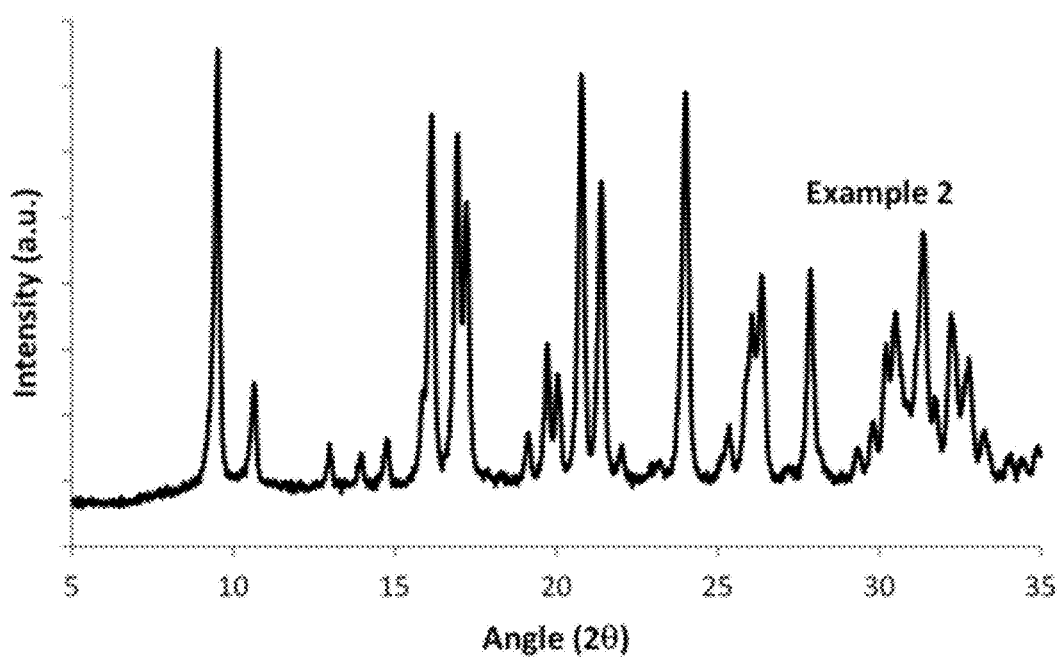
FIG. 2 is a Powder X-ray diffraction pattern of as-prepared direct synthesis of Fe- and Na-containing silicoaluminate AEI zeolite synthesized according to the Example 2.

1.98 g of a 7.0% wt aqueous solution of N,N-dimethyl-3,5-dimethylpiperidinium hydroxide was mixed with 0.24 g of a 20% wt aqueous solution of sodium hydroxide (NaOH granulated, Scharlab). The mixture was maintained under stirring 10 minutes for homogenization. Afterwards, 0.303 g of FAU zeolite (FAU, Zeolyst CBV-720 with SiO$_2$/Al$_2$O$_3$=21) was added in the synthesis mixture. Finally, 0.11 g of a 20% wt aqueous solution of iron (III) nitrate [Fe(NO$_3$)$_3$, Sigma Aldrich, 98%] was added, and the synthesis mixture was maintained under stirring the required time to evaporate the excess of water until achieving the desired gel concentration. The final gel composition was SiO$_2$:0.047 Al$_2$O$_3$:0.01 Fe:0.2 DMDMP:0.2 NaOH:15H$_2$O. The resultant gel was charged into a stainless steel autoclave with a Teflon liner. The crystallization was then conducted at 140° C. for 7 days under static conditions. The solid product was filtered, washed with abundant water, and dried at 100° C. The solid was characterized by Powder X-ray Diffraction, obtaining the characteristic peaks of the AEI structure (see FIG. 2). Finally, the as-prepared solid was calcined in air at 550° C. for 4 h. The solid yield achieved was above 85% (without taking into account the organic moieties). The chemical analysis of the sample indicates a Si/Al ratio of 8.0, an iron content of 1.1% wt and a sodium content of 3.3% wt.

Example 3

Synthesis of Fe-Containing Na-Free AEI Zeolite by Post-Synthetic Ion Exchange

The Na-containing AEI material from Example 1 was first exchanged with a 0.1 M solution of ammonium nitrate (NH$_4$NO$_3$, Fluka, 99 wt %) at 80° C. Then, 0.1 g of ammonium-exchanged AEI zeolite was dispersed in 10 ml of deionized water with pH adjusted to 3 using 0.1 M HNO$_3$. The suspension was heated to 80° C. under nitrogen atmosphere, 0.0002 moles of FeSO$_4$.7H$_2$O was then added, and the resultant suspension maintained under stirring at 80° C. for 1 h. Finally, the sample was filtered, washed and calcined at 550° C. for 4 h. The final iron content in the sample was 0.9 wt % and the Na content was below 0.0% wt.

Example 4

Removal of Na from the Direct Synthesis of the Fe-Containing AEI Material from Example 2

200 mg of the calcined Fe-containing AEI material synthesized according to the Example 2, was mixed with 2 ml of a 1 M aqueous solution of ammonium chloride (Sigma-Aldrich, 98% wt), and the mixture was maintained under stirring at 80° C. for 2 h. The solid product was filtered, washed with abundant water, and dried at 100° C. Finally, the solid was calcined in air at 500° C. for 4 h. The chemical analysis of the sample indicates a Si/Al ratio of 8.0, an iron content of 1.1% wt and sodium content below 0.0% wt.

Example 5

Direct Synthesis of the Fe-Containing CHA Structure (Na-Containing Material)

0.747 g of a 17.2% wt aqueous solution of trimethyl-1-adamantammonium hydroxide (TMAdaOH, Sigma-Aldrich) was mixed with 0.13 g of a 20% wt aqueous solution of sodium hydroxide (NaOH, Sigma-Aldrich). Then, 0.45 g of a colloidal suspension of silica in water (40% wt, LUDOX-AS, Sigma-Aldrich) and 23 mg of alumina (75% wt, Condea) were added, and the resultant mixture maintained under stirring for 15 minutes. Finally, 0.458 g of a 2.5% wt aqueous solution of iron (III) nitrate [Fe(NO$_3$)$_3$, Sigma Aldrich, 98%] was added, and the synthesis mixture was maintained under stirring the required time to evaporate the excess of water until achieving the desired gel concentration. The final gel composition was SiO$_2$:0.05 Al$_2$O$_3$:0.01 Fe:0.2 TMAdaOH:0.2 NaOH:20H$_2$O. The resultant gel was charged into a stainless steel autoclave with a Teflon liner.

The crystallization was then conducted at 160° C. for 10 days under static conditions. The solid product was filtered, washed with abundant water, and dried at 100° C. The solid was characterized by Powder X-ray Diffraction, obtaining the characteristic peaks of the CHA zeolite. Finally, the as-prepared solid was calcined in air at 550° C. for 4 h. The chemical analysis of the sample indicates a Si/Al ratio of 12.6, an iron content of 1.0% wt and a sodium content of 1.5% wt.

Example 6

Removal of Na from the Direct Synthesis of the Fe-Containing CHA Structure from Example 5

100 mg of the calcined Fe-containing CHA material was mixed with 1 ml of a 1 M aqueous solution of ammonium chloride (Sigma-Aldrich, 98% wt), and the mixture maintained under stirring at 80° C. for 2 h. The solid product was filtered, washed with abundant water, and dried at 100° C. Finally, the solid was calcined in air at 500° C. for 4 h. The chemical analysis of the sample indicates a Si/Al ratio of 12.6, an iron content of 1.10% wt and a sodium content of 0.0% wt.

Example 7

Direct Synthesis of the Fe-Containing Beta Structure (Na-Free Material)

0.40 g of a 35% wt aqueous solution of tetraethylammonium hydroxide (TEAOH, Sigma-Aldrich) was mixed with 0.34 g of a 50% wt aqueous solution of tetraethylammonium bromide (TEABr, Sigma-Aldrich). Then, 0.60 g of a colloidal suspension of silica in water (40% wt, LUDOX-AS, Sigma-Aldrich) and 18 mg of alumina (75% wt, Condea) were added, and the resultant mixture maintained under stirring for 15 minutes. Finally, 0.33 g of a 5% wt aqueous solution of iron (III) nitrate [$Fe(NO_3)_3$, Sigma Aldrich, 98%] was added, and the synthesis mixture was maintained under stirring the required time to evaporate the excess of water until achieving the desired gel concentration. The final gel composition was $SiO_2$:0.032 $Al_2O_3$:0.01 Fe:0.23 TEAOH: 0.2 TEABr:20$H_2O$. The resultant gel was charged into a stainless steel autoclave with a Teflon liner. The crystallization was then conducted at 140° C. for 7 days under static conditions. The solid product was filtered, washed with abundant water, and dried at 100° C. The solid was characterized by Powder X-ray Diffraction, obtaining the characteristic peaks of the Beta zeolite. Finally, the as-prepared solid was calcined in air at 550° C. for 4 h. The chemical analysis of the sample indicates a Si/Al ratio of 13.1, an iron content of 0.9% wt and a sodium content of 0.0% wt.

Example 8

Catalytic Test of Materials in the Selective Catalytic Reduction of Nitrogen Oxides Using Ammonia The activity of selected samples was evaluated in the catalytic reduction of $NO_x$ using $NH_3$ in a fixed bed, quartz tubular reactor of 1.2 cm of diameter and 20 cm of length. The catalyst was tested using 40 mg with a sieve fraction of 0.25-0.42 mm. The catalyst was introduced in the reactor, heated up to 550° C. in a 300 NmL/min flow of nitrogen and maintained at this temperature for one hour. Afterwards 50 ppm NO, 60 ppm $NH_3$, 10% $O_2$ and 10% $H_2O$ was admitted over the catalyst while maintaining a flow of 300 mL/min. The temperature was then decreased stepwise between 550 and 250° C. The conversion of NO was measured under steady state conversion at each temperature using a chemiluminiscence detector (Thermo 62C).

Example 9

Accelerated Hydrothermal Aging Treatment of Samples

Selected samples were treated in a gas mixture containing 10% $H_2O$, 10% $O_2$ and $N_2$ for 13 hours at 600° C. and afterwards their catalytic performance was evaluated according to Example 8.

Example 10

Influence of Na on Catalytic Performance of Fe-AEI Before Accelerated Aging

Figure 3:
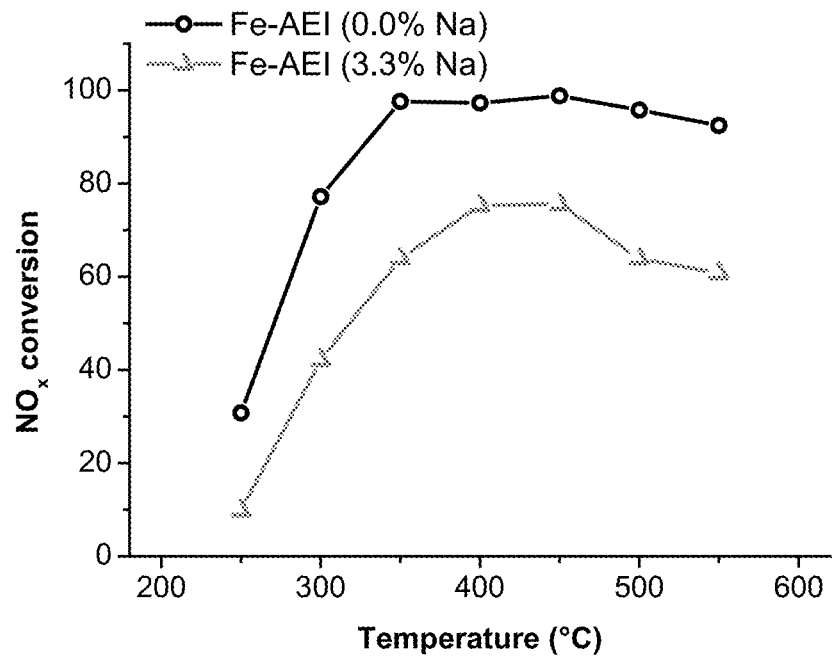
FIG. 3 is a $NO_x$ conversion over Fe-AEI zeolite catalyst with and without Na present.

The Fe-AEI zeolite containing Na as synthesized in Example 2 was tested according to Example 8. For comparison the Fe-AEI zeolite that was essentially free of Na, prepared according to Example 4, was also evaluated in the $NH_3$—SCR reaction according to Example 8. The steady state-conversion of NO is shown as a function of temperature for the two catalysts in FIG. 3. The results clearly show the beneficial influence of removing the Na from the Fe-AEI zeolite as the $NO_x$ conversion increases at all temperatures.

Example 11

Figure 4:
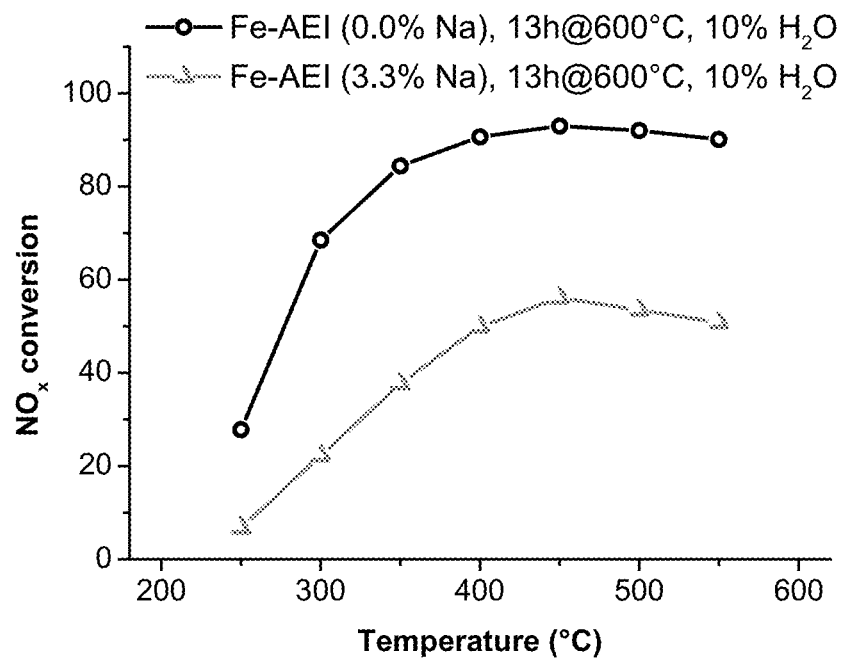
FIG. 4 is a $NO_x$ conversion over Fe-AEI zeolite catalyst with and without Na present after accelerated hydrothermal aging (conditions given in Example 9)

Influence of Na on Catalytic Performance of Fe-AEI after Accelerated Hydrothermal Aging The two zeolites that were tested in Example 10 (and prepared in Example 2 and Example 4) were aged under the accelerated aging conditions given in Example 9. The $NO_x$ conversion after aging is shown in FIG. 4.

Example 12

Figure 5:
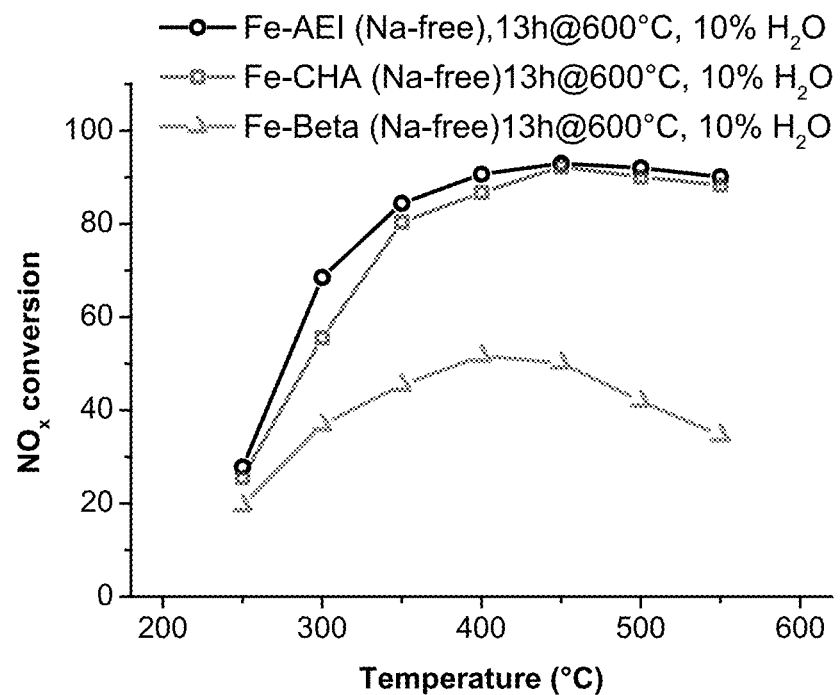
FIG. 5 is a $NO_x$ conversion over Na-free Fe-AEI compared to state-of-the-art Fe-CHA and Fe-Beta zeolites (also Na-free) after accelerated hydrothermal aging (conditions given in Example 9)

Catalytic Performance of Na-Free Fe-AEI Compared to State-Of the Art Fe-Beta and Fe-CHA Zeolites after Accelerated Hydrothermal Aging The $NO_x$ conversion over Na-free Fe-AEI, prepared according to Example 4, was evaluated in the $NH_3$—SCR reaction after accelerated hydrothermal aging. For comparison Na-free Fe-CHA and Na-free Fe-Beta catalysts (prepared in Example 6 and Example 7, respectively), which represents state-of-the-art iron promoted zeolite catalysts, were also tested after accelerated hydrothermal aging. The measured $NO_x$ conversion is shown in FIG. 5. As can be seen the NOx conversion is higher over Na-free Fe-AEI compared to the other zeolites.

Example 13

Figure 6:
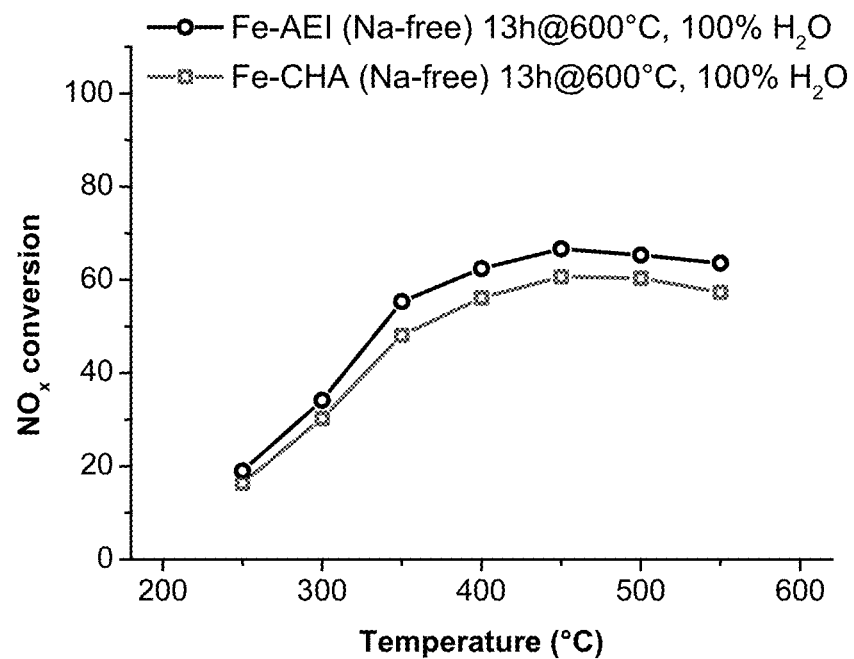
FIG. 6 is a $NO_x$ conversion over Na-free Fe-AEI compared to state-of-the-art Na-free Fe-CHA after severe accelerated hydrothermal aging at 600° C. with 100% $H_2O$ aging.

Catalytic Performance of Na-free Fe-AEI Compared to State-Of the Art Fe-CHA Zeolites after Severe Accelerated Hydrothermal Aging A severe accelerated aging of Na-free Fe-AEI and Na-free Fe-CHA prepared in Example 4 and Example 6 respectively was performed by steaming the catalyst in a muffle furnace with 100% H$_2$O for 13 h at 600° C. Afterwards the samples were evaluated according to Example 8. The NO$_x$ conversion in the NH$_3$—SCR reaction over the two Fe-zeolites is shown in FIG. 6. As seen from FIG. 6 the improved stability of Fe-AEI is evident from the higher NO$_x$ seen at all temperatures.

Example 14

Determination of Crystal Size

Figure 7:
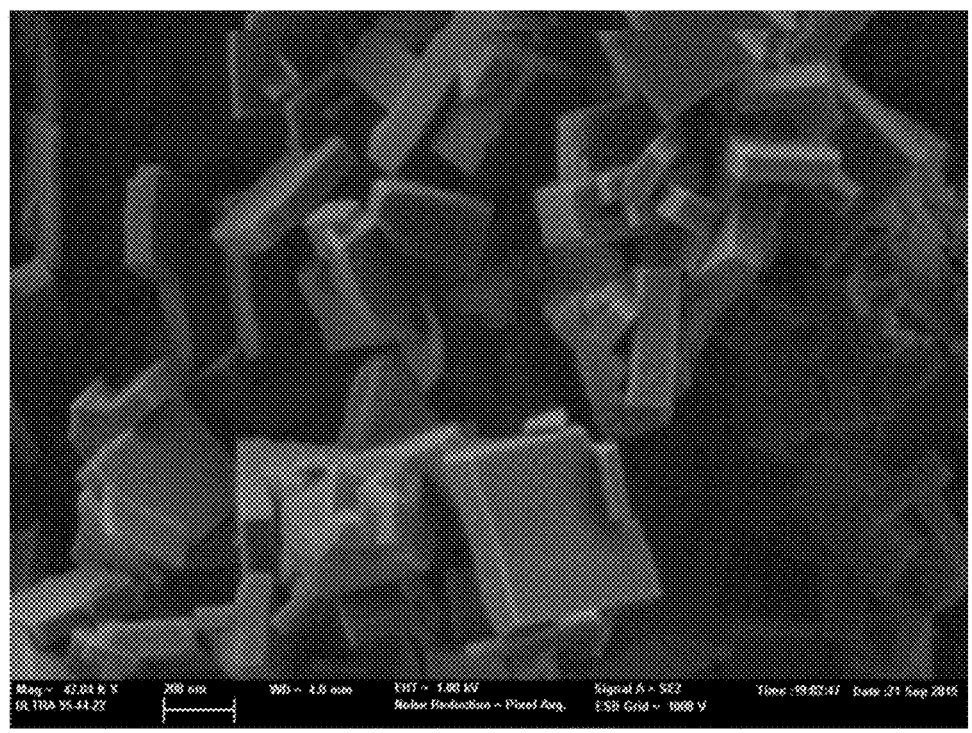
FIG. 7 is a SEM image of the Fe-AEI material synthesized according to Example 2.

The Fe-containing AEI zeolite prepared in Example 2 was characterized using scanning electron microscopy to determine the size of the primary zeolite crystals. FIG. 7 shows an image of the obtained material that indicates primary crystallite sizes up to 400 nm.

Example 15

Measurement of Porosity Loss During Accelerated Hydrothermal Aging of Fe-AEI Zeolites The surface area and porosity of a sample prepared according to Example 4 and the same sample hydrothermally aged according to Example 9 using nitrogen adsorption. The results are given in Table 1. As seen the surface area and porosity of the Na-free Fe-AEI catalyst is decreased less than 25% after the accelerated hydrothermal aging treatment.

TABLE 1

Surface area and porosity measurement of Na-free Fe-AEI before and after accelerated hydrothermal aging (according to Example 9).

| Material | BET surface area (m$^2$/g) | Micropore area* (m$^2$/g) | Micropore volume* (cm$^3$/g) |
|---|---|---|---|
| Na-free Fe-AEI | 516 | 505 | 0.25 |
| HT AGED Na-free Fe-AEI | 411 | 387 | 0.19 |
| Percentage loss | −20% | −23% | −24% |

*calculated using the t-plot method

The invention claimed is:

1. A method for the removal of nitrous oxide from off gas, which comprises
removing nitrous oxide from the off gas by contacting the off gas directly or together with a reducing agent or a precursor thereof with a catalyst comprising an Fe-AEI zeolite material essentially free of alkali metal ions (Alk), said Fe-AEI zeolite material having the following molar compositions:

SiO$_2$: $o$Al$_2$O$_3$: $p$Fe: $q$Alk wherein o is in the range from 0.001 to 0.2;
wherein p is in the range from 0.001 to 0.2; and
wherein Alk is one or more of alkali ions and wherein q is less than 0.02, via
(a) direct decomposition wherein the catalyst is located inside an ammonia burner, or
(b) selective catalytic reduction wherein the catalyst is located after the production of nitric acid wherein nitrogen dioxide is adsorbed in water and results in nitrous oxide.

2. The method according to claim 1, wherein o is in the range from 0.005 to 0.1, p is in the range from 0.005 to 0.1 and q is below 0.005.

3. The method according to claim 1, wherein o is in the range from 0.02 to 0.07, p is in the range from 0.01 to 0.07 and q is below 0.001.

4. The catalyst of claim 1, wherein Alk is sodium.

5. The method of claim 1, wherein the off gas contains more than 0.05% steam.

6. The method of claim 1, wherein the off gas is at a temperature of above 200° C.

7. The method of claim 1, wherein the catalyst is coated within or on a substrate.

8. The method of claim 7, wherein the substrate is a metallic substrate or an extruded ceramic substrate or a corrugated ceramic substrate.

9. The method of claim 7, wherein the substrate is in form of a flow-through monolith, a flow-through honeycomb, or a wall-flow filter.

10. The method of claim 7, wherein the catalyst is coated in an amount of between 10 and 600 g/L calculated on the weight of catalyst material per volume of the total substrate including the catalytic material.

11. The method of claim 10, wherein the amount is between 100 and 300 g/L.

12. The method of claim 7, wherein the catalyst is coated in or on the porous substrate in form of a wash coat comprising the catalyst and a binder comprising TiO$_2$, SiO$_2$, Al$_2$O$_3$, ZrO$_2$, CeO$_2$, and combinations thereof.

13. The method of claim 7, wherein the catalyst is coated as a layer on the substrate and wherein the substrate comprises one or more other layers comprising a catalyst with a different catalytic activity or on other zeolite catalysts.

14. The method of claim 7, wherein the catalyst is zone coated on the substrate.

15. The method of claim 1, wherein the off gas is formed during production of nitric acid or adipic acid.

16. The method according to claim 1, wherein the reducing agent is selected from the group consisting of ammonia, hydrocarbon, nitrogen monoxide, and mixtures thereof.

17. The method according to claim 1, wherein the reducing agent is added in controlled amounts to the off gas upstream of the catalyst.

18. The method of claim 1, wherein nitrogen oxides are reduced by an additional catalyst unit, by the addition of a reducing agent, or both.

19. The method of claim 18, wherein the additional catalyst unit comprises the Fe-AEI zeolite material essentially free of alkali metal ions (Alk).

20. The method according to claim 18, wherein the reducing agent is selected from the group consisting of ammonia and hydrocarbons.

21. The method according to claim 20, wherein the catalyst comprising an Fe-AEI zeolite material essentially free of alkali metal ions (Alk) is combined with a second catalyst composition active in the selective reduction of nitrogen oxides.

22. The method according to claim 1, wherein the catalyst is located after an ammonia oxidation catalyst or after an ammonia oxidizer.

* * * * *